United States Patent Office 3,531,559
Patented Sept. 29, 1970

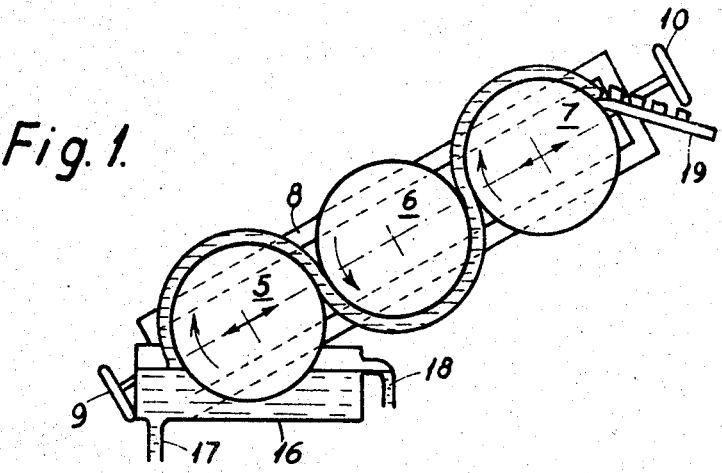
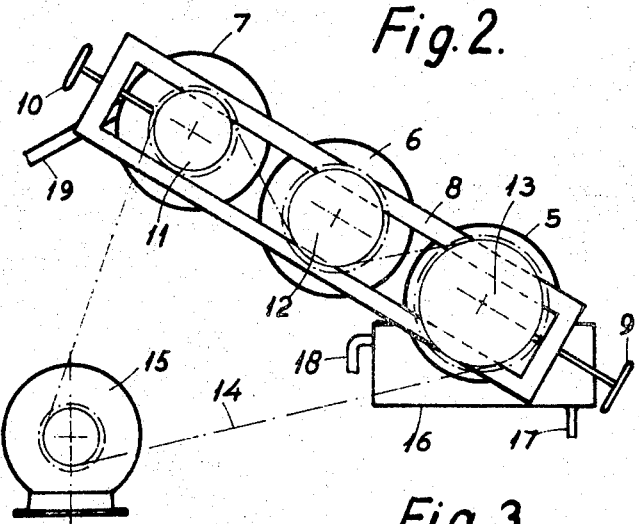
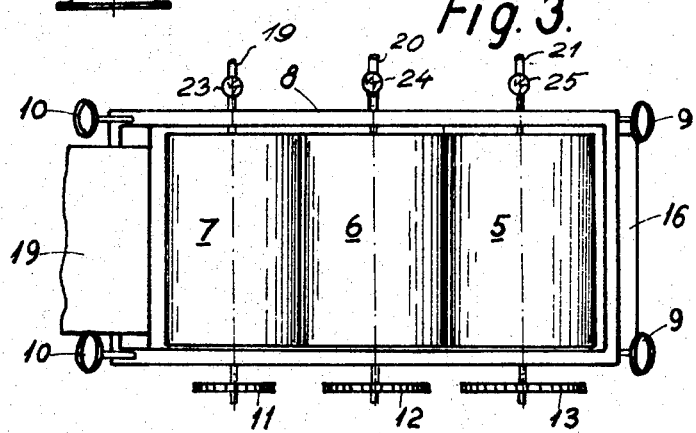

3,531,559
METHOD AND APPARATUS FOR THE PRODUCTION OF A CANDLE MATERIAL GRANULATE
Niels Georg Barfred, Hojbjerghus, Holte, Denmark
Filed Oct. 18, 1967, Ser. No. 676,093
Claims priority, application Great Britain, Oct. 21, 1966, 47,329/66
Int. Cl. B02c *4/10;* B29c *23/00*
U.S. Cl. 264—144                5 Claims

ABSTRACT OF THE DISCLOSURE

A method and apparatus for the production of a composite candle material granulate, the main components of which are paraffin and stearin, are disclosed. The material which is initially in a melted homogenized form is deposited onto a cooled surface and then passed through a space defined by the cooled surface and a second cooled surface such that the cooled surfaces confine the material to a predetermined thickness. A series of rollers are used to progressively decrease the thickness of the material while the material continues to be cooled. Finally, the material is scraped from the last cooled surface in a solidified granulate form so as to be suitable for extrusion in a candle extruder.

---

This invention relates to the production of a solid comminuted candle material, in the following referred to as a granulate, from a melt of the components.

In recent years, the old method of casting candles in moulds is gradually being abandoned in favour of extrusion processes, in which a granulate of the candle material is extruded as a continuous rod around a wick, and is later divided into appropriate lengths and shaped at the ends to the usual candle shape.

However, various difficulties have to be overcome in order to get properly burning candles in this manner. Thus, it has proved extremely difficult to secure the necessary homogeneity throughout the candle body, because starting with a cold granulate, a certain amount of heat has to be supplied in the extruder in order to make the candle material fit for extrusion. Some of the heat is produced by the working of the extruder screw or screws in the material, and the rest is supplied by providing the extruder with a heating jacket at or near the extruder head. Since the candle material is an exceedingly bad heat conductor, it will obviously be very difficult to get the material uniformly heated in this manner during the extrusion process.

Moreover, economic reasons compel the candle manufacturer to use a composite candle material, the main component of which is paraffin, which is a comparatively cheap raw material, but gives a poor quality of candles, when used alone. To improve the quality, a minor proportion of the more costly stearin is admixed, generally not exceeding 20 percent of the composite material.

Pure stearin being excellent for candle making, the admixture of stearin greatly improves the properties of the paraffin in this respect.

However, the admixture of stearin adds to the difficulties of preparing a suitable granulate, and in homogenizing the composite candle material, owing to the differences in crystallinity and melting range of the two components.

The main object of the present invention is to overcome these difficulties in order to obtain a candle material granulate of optimal properties for producing candles by an extrusion process.

Thus, in its broadest aspect, the present method of producing a composite candle material granulate, the main components of which are paraffin and stearin, comprises melting the candle material, thoroughly stirring to homogenize the melted material, transferring the homogenized material to a moving, cooled surface, being spaced from another cooling surface at a distance substantially corresponding to one desired dimension of the granulate to be produced, passing the material through said space, and delivering it to a candle extruder in solid granulate form.

In the melted state, homogenization of the component mixture is easily performed, and the cooling from both sides of the melted composition gives a homogenous solidification.

A preferred embodiment of the present method comprises supplying a layer of the melted and thoroughly mixed candle material to the first of a succession of internally cooled, slightly spaced rollers, adjusting the intervening spaces of the succession of rollers, so as to correspond to the thickness of the layer picked up by the first roller, and increasing the cooling and peripheral speed of each succeeding roller to transmit the layer of candle material from one roller ot the next, and finally scraping off the layer from the last roller.

Owing to the layer being alternatively cooled from both sides, the resulting, partly broken layer or granulate will become exceedingly homogenous both as to crystallinity and as to temperature, and by suitably adjusting the temperature of the melted candle material and the peripheral speeds and cooling of the various rollers, the resulting material can be fed to the extruder in optimal condition for the extrusion.

In an alternative embodiment (not shown), the melted and homogenized candle material is deposited as drops on a cooled endless metal band, for example a stainless steel band, and carried forward under another cooled, endless metal band, running parallel to the former at a distance slightly less than the thickness or height of the drops, the length of the bands and the cooling being adjusted so that the drops will have solidified on reaching the return end of the band, when they are scraped off.

A suitable apparatus for carrying out the former embodiment of the present method comprises a set of at least three rollers with means for internal cooling, means for adjusting the intervening spaces and means for driving the rollers at different peripheral speeds, the first of said rollers being mounted in or above a supply vessel for melted candle material and being adapted to pick up a layer of said material, a scraper being fitted to remove the cooled and solidified material from the last of the rollers.

For further understanding of the inventive idea, reference is made in the following to the accompanying drawings schematically illustrating an embodiment of a roller arrangement for use in the present method, FIG. 1 showing a longitudinal section through the rollers, FIG. 2 the driving means for the rollers, and FIG. 3 a plan view of the arrangement.

Three rollers, 5, 6, and 7, are mounted in a sloping frame 8 in such manner that the axle bearings of the rollers 5 and 7 can be displaced by the hand-wheels 9 and 10 respectively to adjust the spaces between these rollers and the roller 6 being mounted in fixed bearings in the frame 8.

Sprockets 11, 12, and 13 respectively are mounted on the hollow axles of the rollers 5, 6, and 7, a chain 14 passing over said sprockets driving all three rollers from an electromotor 15. As will be seen from FIG. 2, the chain 14 passes over the sprockets 11, 12, and 13 in such manner that the direction of rotation changes from roller to roller as indicated by arrows. Further the diameter of the sprockets decrease from roller to roller so that the peripheral speed of roller 6 is greater than that of roller 5, and that of roller 7 is again greater than that of roller 6.

The roller 5 dips into a vessel 16, to which melted candle material is pumped through an inlet 17 and overflowing through an outlet 18 to keep a constant level and a constant temperature of the material in the vessel.

The rollers 5, 6, and 7 are individually cooled internally by means of water being admitted to one end of their hollow axles 19, 20, and 21, respectively, and having at the other end, valves 23, 24, and 25 being adapted for individually adjusting the flow rate in each roller.

On rotating the rollers by means of the chain 14, roller 5 picks up a layer of the melted candle material. The space between rollers 5 and 6 is then adjusted so that the surface of the latter contacts the layer of candle material on the former.

By stronger cooling, and because the roller 6 is driven with a greater peripheral speed than the roller 5, the candle material layer on the latter will pass over on the roller 6. The same procedure is repeated at roller 7, which is still more cooled, and rotates at a greater peripheral speed than roller 6.

Finally, a master blade 19 removes the layer of the now solidified candle material from the roller 7 and breaks it up into a granulate, which passes directly into the hopper of an extruder which is situated, for example, directly below the blade 19 so as to receive the granulate therefrom.

Since the layer is alternatively cooled from both sides, the resulting granulate will be exceedingly homogenous as to crystallinity and surface temperature. The interior of each granule may be somewhat warmer than the surface, but that will be an advantage, since it means that less heat has to be supplied in the extruder in order to make the candle material extrudable.

I claim:
1. A method of producing a granulated composite candle material, the main components of which are paraffin and stearin, comprising transferring a layer of a molten homogenous mixture of said components upon the surface of the first of a succession of internally cooled rotating rollers each slightly spaced from the other a distance corresponding substantially to one desired dimension of the granulate to be produced, passing said layer through said spaces between each of said rollers to cool and solidify said layer while transferring said layer from said first roller to each succeeding roller, adjusting the spaces between each of said rollers to correspond to the thickness of said layer on said first roller, increasing the cooling of said layer in passing from said first roller to each of said succeeding rollers, increasing the peripheral speed of each succeeding roller relative to that of said first roller, and scraping the solidified layer from the final roller to break up said layer into a granulate having one dimension equal to said spaces between said rollers.

2. An apparatus for producing a granulated composite candle material, the main components of which are paraffin and stearin comprising a succession of rotatable rollers for receiving a layer of homogenous mixture of said components upon the surfaces thereof, each of said rollers being slightly spaced from the other a distance corresponding substantially to one desired dimension of the granulate to be produced so as to pass said layer through said spaces between each of said rollers from said first roller to each succeeding roller, means for adjusting the spaces between each of said rollers to correspond to the thickness of said layer on said first roller, means for cooling each of said rollers in a successive manner to cool and solidify said layer thereon, said means increasing the cooling of said layer in passing from said first roller to each of said succeeding rollers, means for increasing the peripheral speed of each succeeding roller relative to that of said first roller, and means for scraping the solidified layer from the final roller of said rollers to break up said layer into a granulate having one dimension equal to said spaces between said rollers.

3. An apparatus as set forth in claim 2 further comprising means for driving said rollers in successively different directions.

4. An apparatus as set forth in claim 2 further comprising means for depositing molten candle material on the first of said rollers for forming of said layer.

5. An apparatus as set forth in claim 2 wherein said rollers consist of three rollers.

References Cited
UNITED STATES PATENTS

| | | | |
|---|---|---|---|
| 2,590,544 | 3/1952 | Kallok | 264—144 |
| 2,592,985 | 4/1952 | Walrafen. | |
| 2,697,249 | 12/1954 | Bettes et al. | 264—144 |
| 3,064,311 | 11/1962 | Bain et al. | 264—144 |

ROBERT F. WHITE, Primary Examiner

J. R. HALL, Assistant Examiner

U.S. Cl. X.R.

18—1, 2